United States Patent [19]

Reece et al.

[11] Patent Number: 5,734,984
[45] Date of Patent: Mar. 31, 1998

[54] TELEPHONE SYSTEM FOR MOBILE WIRELESS TELEPHONE SERVICES

[75] Inventors: Christopher Sean Reece, Garland, Tex.; Howard Martin Sandler, Ottawa, Canada; William John Newman, Kanata, Canada; Keith Daniel O'Neill, Dunrobin, Canada; David Michael Priest, Kanata, Canada; Paul Murray Row, Bishops Stortford, England; Jorge Alberto Del Rio, Aylmer, Canada; Jastinder Singh Jawanda, Plano, Tex.

[73] Assignee: Northern Telecom Limited, Montreal, Canada

[21] Appl. No.: 589,573

[22] Filed: Jan. 22, 1996

Related U.S. Application Data

[63] Continuation of Ser. No. 159,486, Nov. 30, 1993, abandoned.

[51] Int. Cl.$^6$ .................................................. H04Q 7/38
[52] U.S. Cl. ........................... 455/458; 455/436; 455/437; 455/31.2
[58] Field of Search .................................. 379/60, 62, 58, 379/59; 455/33.1, 33.2, 33.4, 56.1, 458, 436, 437, 31.2; H04Q 7/38

[56] References Cited

U.S. PATENT DOCUMENTS

| | | | |
|---|---|---|---|
| 4,833,702 | 5/1989 | Shitara et al. | 379/60 |
| 4,873,682 | 10/1989 | Irwin et al. | 370/58 |
| 4,893,310 | 1/1990 | Robertson et al. | 370/110 |
| 5,136,585 | 8/1992 | Nizamuddin et al. | 370/110.1 |
| 5,305,466 | 4/1994 | Taketsugu | 379/59 |
| 5,361,396 | 11/1994 | Onoe et al. | 455/33.4 |
| 5,533,094 | 7/1996 | Sanmugam | 379/59 |

FOREIGN PATENT DOCUMENTS

| | | |
|---|---|---|
| 0 291 068 | 11/1988 | European Pat. Off. . |
| 0 475 865 | 3/1992 | European Pat. Off. . |
| 2 211 699 | 7/1989 | United Kingdom . |

OTHER PUBLICATIONS

Lynch, D. et al., "System Architecture", Telesis, pp. 21–29 (1989).

Jervis, B. et al., "New Generation in Key System Design", Telesis, pp. 5–20 (1989).

Okamoto, Kei, "A Study on Enhancement of Digital Cordless Telephone System in a PABX" *International Switching Symposium 1992 Proceedings*, vol. 1, Oct. 25, 1992, Yokohama, Japan pp. 184–188.

Taketsugu, Masanori et al., "Holonic Location Registration/Paging Procedure in Microcellular Systems", *IEICE Transactions of Fundamentals of Electronics, Communications and Computer Sciences*, vol. E75–A, No. 12, Dec. 1992, Tokyo, Japan, pp. 1652–1659.

*Primary Examiner*—Thomas L. Stoll
*Attorney, Agent, or Firm*—Foley & Lardner

[57] ABSTRACT

A wireless telephone system is adapted for serving portable telephone sets of itinerant users. The wireless telephone system is provided with a plurality of radio base stations being organized in at least two groups or paging areas. Each group has a boundary, a portion of each boundary being overlapped by at least one other boundary, and at least two of the at least two groups having at least two radio base stations, one of which is in common with the other group. From time to time in relation to each group, a beacon signal is radio transmitted from a radio base station exclusive to the group for soliciting a recordation response from a portable telephone set of an itinerant user within a beacon zone. When the presence of a respondent portable set is recorded as being within a service area of one of the groups, the portable set is instructed not to respond to subsequent occurrences of the same beacon signal for some hours to avoid cluttering the wireless spectrum with undue supervisory signalling. A call request wherein the itinerant user is a called party, results in the recorded portable set being paged via at least an idle one of the radio base stations of the group within which the portable set is recorded as being present, whereby the itinerant user may be called via the wireless telephone system without any requirement for the user to have prior knowledge of or to have taken any action in relation to the wireless telephone service.

13 Claims, 13 Drawing Sheets

Repeating for a period of 3 seconds at 30 second intervals unless preempted by telephone traffic usage of available spectrum.

PAGING AREA LIST 41    ZONE BEACON LIST 41

| Paging Area | | Zone Beacon |
|---|---|---|
| | | 411 |
| | | 412 |
| 425 | | 413 |
| 426 | | 414 |
| 427 | | 415 |
| 428 | | 416 |
| 429 | | 417 |
| 430 | | 418 |
| 431 | | 419 |
| 432 | | 420 |
| 453 | | 421 |
| 454 | | 422 |
| 455 | | 423 |
| | | 424 |

PAGING AREA LIST 44    ZONE BEACON LIST 44

| Paging Area | | Zone Beacon |
|---|---|---|
| | | 441 |
| | | 442 |
| 425 | | 443 |
| 426 | | 444 |
| 427 | | 445 |
| 428 | | 446 |
| 429 | | 447 |
| 430 | | 448 |
| 431 | | 449 |
| 432 | | 450 |
| 453 | | 451 |
| 454 | | 452 |
| 455 | | |

PAGING AREA LIST 47    ZONE BEACON LIST 47

| Paging Area | | Zone Beacon |
|---|---|---|
| | | 471 |
| | | 472 |
| 425 | | 475 |
| 426 | | 475 |
| 427 | | 477 |
| 428 | | 478 |
| 429 | | 479 |
| 430 | | 480 |
| 431 | | 483 |
| 432 | | 484 |
| 453 | | |
| 454 | | |
| 455 | | |

*Fig. 8*

TELEPHONE SYSTEM FOR MOBILE WIRELESS TELEPHONE SERVICES

This application is a continuation of application Ser. No. 08/159,486, filed Nov. 30, 1993 abandoned.

FIELD OF THE INVENTION

This invention relates to wireless communication systems, and more particularly, to a telephone system for providing mobile wireless telephone service to portable telephone sets and the like.

BACKGROUND OF THE INVENTION

Wireless telephones such as cordless phones and cellular phones have become popular beyond expectation. A cordless phone is usually functional over a range of within about 30 meters of its associated base station. The associated cordless base station set is connected via a telephone line to a central office exchange, just as a typical telephone is connected. A cellular phone can be functional over an area ranging from hundreds of square miles to an area including vast portions of a continent. Cellular phones are supported by cellular telephone systems which typically include mobile telephone central switching exchanges each of which is connected to a multitude of geographically distributed cellular radio stations via a corresponding multitude of multi-channel trunks. In populous areas, cellular systems are rapidly becoming overloaded with the result that mobile telephone services are sometimes degraded or from time to time momentarily unavailable. As a compliment to the cellular systems, a new standard referred to as CT2 has been adopted in some countries such as the United Kingdom. This standard defines low power radio links in a different portion of the radio frequency spectrum with respect to that of the cellular spectrum and was originally intended as a cordless phone standard. A typical low power link is usually functional over distances of up to about 200 meters or so. While the CT2 standard was evolving, it was envisaged that it would apply to wireless telephony wherein the wireless portable telephone set would be operationally confined to the immediate area of one particular related cordless base station or radio base station. Any provision for a wireless link to be transferrable between two or more radio base stations during the progress of a telephone call was not specified in the standard.

One example of a wireless telephone system having a transferrable wireless link is disclosed in U.S. patent application No. 961,769 filed on Oct. 16, 1992 by K. D. O'Neill et al, and titled "Low-power Wireless System for Telephone Services". O'Neill et al introduce a micro cellular system structure and radio link control methods which are suitable for direct application in a telephone switch to provide efficient spectrum utilization and call management for low power systems which may be operated in accordance with the CT2 standard. The first uses of this system have been limited to private telephone systems. As with cellular telephone services, a user must be recorded with the system as being a subscriber prior to the user being availed of telephone services. Registration of the user's portable telephone set includes making an identity code of record within the wireless telephone system or within the telephone system of an associated telephone operating company. A portable telephone set capable of operation in the CT2 standard and bearing an identity code which has previously been registered as being subscribed to wireless telephone service may receive telephone service. This requirement for user subscription is intended to limit access by individual portable telephone sets to the system or systems within which each portable telephone set is intended to operate. In relation to private wireless telephone systems, portable telephone sets of itinerant users would not normally be registered and hence are not serviced by the private wireless telephone system.

Recently a new low power portable telephone service, in accordance with the CT2 standard, has become available in public areas for example within shopping malls and within passenger facilities at public transport stations and ports in various countries, the United Kingdom being one, for example. The portable telephone service is available at identified fixed antenna locations. When adjacent to one of the fixed antenna locations, a portable telephone user is able to initiate a telephone call. In order for the initiated call to progress to a connection with a called party, the wireless telephone service provider must be able to identify the user's portable telephone set for purposes of billing. Conversely if a party calls the user's portable telephone set, in order for the call to progress to the portable telephone set, the portable telephone set's identity must have been registered in the wireless system and the presence of the portable set within the service area of one of the fixed antenna locations must be of record. Record of the presence of the portable telephone is contingent upon the portable telephone set user having pressed an active button on the portable telephone set or at least having attempted to originate a telephone call from the portable set, after having entered the service area of an identified antenna location. Otherwise the service provider is unaware of the physical presence of the portable telephone set. If the service provider apparatus is able to identify, either within the wireless telephone facility or in some other associated facility, a record confirming that the user's portable set is subscribed to wireless service, then wireless service is provided as appropriate. Mobility is not provided. If during the progress of the telephone call the portable set user happens to carry the portable telephone set beyond the service area of the identified antenna location, the telephone call is cut off by failure of the radio link between the portable telephone set and the antenna.

In any event, portable telephone service is not provided until after the user has taken some positive action with the portable set. Without record of the presence of the portable set, the wireless system is unable to connect with the portable set even though it is within the service area.

The lack of ability for the wireless service provider's operation to complete calls to portable sets, without the portable set user having first pro-actively made record of his presence, and the lack of mobility reduces the quality of service to the user and likewise reduces the revenue potential associated with the service provider's investment in the wireless telephone system.

It is an object of the invention to permit a subscribed user of wireless telephone services to automatically be locally recorded automatically after having entered a service area of a local service provider of low power wireless telephone services and thereafter be availed of said services until such time as the user leaves the service area of the local service provider.

It is a further object of the invention, to permit the locally recorded user to roam at will throughout an entire service area of a service provider or contiguous service areas of the service provider, all the while being availed of the low power wireless telephone services.

A low-power wireless telephone system similar to that introduced by O'Neill et al can be used to provide mobile wireless telephone services in both private and public service areas. However, it has been found that telephone traffic characteristics in public areas, where message rate billing is in effect, are significantly different than in private service areas. In public service areas it has been found that although many potential users may be within a given service area, call frequency and call holding times are reduced as compared with typical telephone traffic in a private service area. Hence it has been realized that because of these different traffic characteristics, the CT2 standard spectrum can be more efficiently utilized for mobile wireless telephony in public service areas than was previously expected, and that the operating energy requirement of an active on hook portable set may be reduced.

SUMMARY OF THE INVENTION

A telephone system for providing wireless telephone services in public areas in accordance with the invention, is arranged such that each of a plurality of paging signal areas includes one beacon signal zone of lesser area and contained within the paging signal functional area. Beacon signals for soliciting responses from portable sets within the paging area are broadcast from time to time from at least a radio base station in each of the beacon zones. Upon entering a beacon zone, a portable set is intended to respond to a broadcast of a beacon signal by broadcasting its identity to make its presence of record as being within the paging area. Thereafter no further responses to beacon signals are required unless the portable set moves to another beacon zone.

A portable telephone set suitable for use within the service area of a wireless service provider is arranged to respond to a unique beacon signal, when it is first received, by transmitting a prearranged code which identifies the portable telephone set for the purpose of making record of its presence within a beacon zone of the wireless telephone system. Thereafter the portable telephone set is non-responsive to subsequent beacon signals providing that the beacon signal is of said same unique identity. Should the identity of a beacon signal received at the portable set be different however, then the portable set is arranged to respond by transmitting the prearranged identity code to effect record of its presence, in response to the different beacon signal.

It may be advantageous to have portable telephone sets arranged so that once recorded a predetermined period of time must pass before the portable set may again transmit its unique identity signal, to prevent frequent re-recordations of its presence as may otherwise occur if the portable set is operating near limits of ranges of two or more different beacon signals. An alternative may be to require that a beacon signal of the same identity be received at least twice consecutively by the portable telephone set, before the portable telephone set responds. It may also be advantageous to require that the portable telephone set transmit a signal for making record of its presence in the service area with the telephone system every few hours or so to confirm its continued presence within the system or an operating zone therein. Furthermore, it may be advantageous to provide portable telephone sets that are receptive to a timing instruction from the telephone system, whereby after an elapsed time as specified by the timing signal, a portable telephone set will automatically respond to the next received beacon signal or series of received beacon signals by again transmitting a signal for making record of its presence in the service area of the wireless telephone system.

In accordance with the invention a digital telephone system provides for radio links between portable sets, including itinerant portable sets, and any of a plurality of radio base stations, each of which is connected by a communications conduit to the digital telephone system. The digital telephone system comprises a port circuit for interfacing an operating signal format of the communications conduit with an operating signal format of the digital telephone system. The operating signal format of the communications conduit includes a bidirectional message channel and at least one bidirectional communication channel, wherein the operating signal format of the digital telephone system includes frame organized channels. A service controller receives and transmits message signals via the frame organized channels, and a switch is responsive to the service controller for transferring communication signals from a frame organized channel of any one port to a frame organized channel of any other port. The service controller comprises a plurality of cell managers each being responsive to message signals received from any of the radio base stations for causing one of the radio base stations to maintain a radio link with the recorded portable set of a calling or called party, and means for causing a recordation solicitation to be broadcast from time to time via predetermined ones of the radio base stations and for recording the identity of any billable itinerant portable station set responsive thereto; whereby an itinerant user of wireless telephone service may be unaware of an available low power wireless telephone service and yet be the recipient of a telephone call routed via the digital telephone system.

More specifically the invention provides wireless telephone services for itinerant users of wireless portable sets, whereby the itinerant user of the wireless telephone service may be unaware of an area of low power wireless telephone service and yet be availed of a low power wireless radio link. The telephone system includes a plurality of ports for transferring communications signals between radio base stations and channels in an operating signal format of the telephone system, a service controller and switch means being responsive to the service controller for providing a communication path via the port associated with a radio link. The service controller is operable for causing n of the radio base stations from time to time to broadcast a recordation solicitation in the form of a zone beacon signal including a repetitive recordation solicitation. The service controller is responsive to signalling received in relation to the recordation solicitations for recording a portable telephone set identity, and for transmitting a zone confirmation of said recordation via a radio base station from whence the signalling was received. Thereafter the service controller is responsive to a request for connection, in which the registered portable telephone is identified as being a called party, by causing paging signals to be transmitted from at least the n radio base stations plus at least one more of the radio base stations, and is responsive to an answer from the paged wireless portable set for selecting a one of the radio base stations from within the n plus at least one more of the radio base stations for establishing the radio link with the wireless portable set of the called party.

In one example, the service controller includes a plurality of cell managers each for controlling functions within a cell consisting of one or more of the n radio base stations, and another of the cell managers being logically associated with at least the plus one more radio base station. A reception characteristic of the n radio base stations defines geographical operating limits of a zone within which the presence of a portable set may be recorded with the telephone system, and wherein a reception characteristic of the n radio base stations combined with at least the plus one more radio station, defines geographical operating limits of a paging area, within which a portable set may be radio linked under control of one of the cell managers, whereby the geographical operating limits of the paging area are broader than the geographical operating limits of the zone.

In this example, the itinerant user may also be availed of mobile service in that each cell manager includes means responsive to signal strengths as received from time to time at any of its radio base stations including a radio base station being radio linked with a portable set, for transferring the radio link to another of its radio base stations contingent upon the other radio base station having received a greater signal strength from the portable set. Furthermore, each cell manager may act in concert with another cell manager to effect a handoff of the radio link from said radio base station to a one of the plurality of radio base stations in an neighbour cell.

A method for providing wireless telephone service for portable telephone sets, including portable telephone sets of itinerant users who from time to time may enter, linger, traverse, and depart the service area of operation of the wireless telephone system, comprises the steps of:

providing a plurality of radio base stations being organized in at least two groups, each group having a boundary, a portion of each is boundary being overlapped by at least one other boundary, each group including at least one radio base station in common with said another group, each radio base station being capable of supporting a radio link for communications with a portable telephone set;

in relation to each group, from time to time soliciting a recordation response via the radio base stations exclusive to the group, recording the presence of a respondent portable set of an itinerant user as being within a service area of one of the groups, and responsive to a call request wherein the itinerant user is a called party, paging the recorded portable set via otherwise idle ones of the radio base stations of the group within which the portable set is registered, whereby the portable set of the called itinerant user may be called via the telephone system without any requirement for the user to have prior knowledge of or to have taken any action in relation to the wireless telephone service.

Examples of small telephone systems are disclosed in each of U.S. Pat. Nos. 4,873,682; 4,893,310; and 5,136,585; issued in the names of George Irwin et al, David Robertson et al, and Nadir Nizamuddin et al respectively, each being titled "Digital Key Telephone System". A small telephone system is discussed by Brian Jervis et al in an article titled "New generation in key system design", pages 5–20; and is discussed by David Lynch et al in an article titled "System Architecture", pages 21–29, both published by Bell-Northern Research in Telesis 1989, Number 2. These publications are exemplary of the forms of some telephone systems wherein the invention may be embodied.

BRIEF DESCRIPTION OF THE DRAWINGS

An example of a small telephone system for providing wireless connectivity with a plurality of portable station sets including portable sets of itinerant users, is discussed with reference to the accompanying drawings in which:

FIG. 5b shows the thresholds of FIG. 5a with respect to the cell community of FIG. 4a;

FIG. 8 illustrates an example of memory lists for defining cell topology within beacon zones and paging areas illustrated in FIG. 4b;

DESCRIPTION OF THE PREFERRED EMBODIMENT

Figure 1:
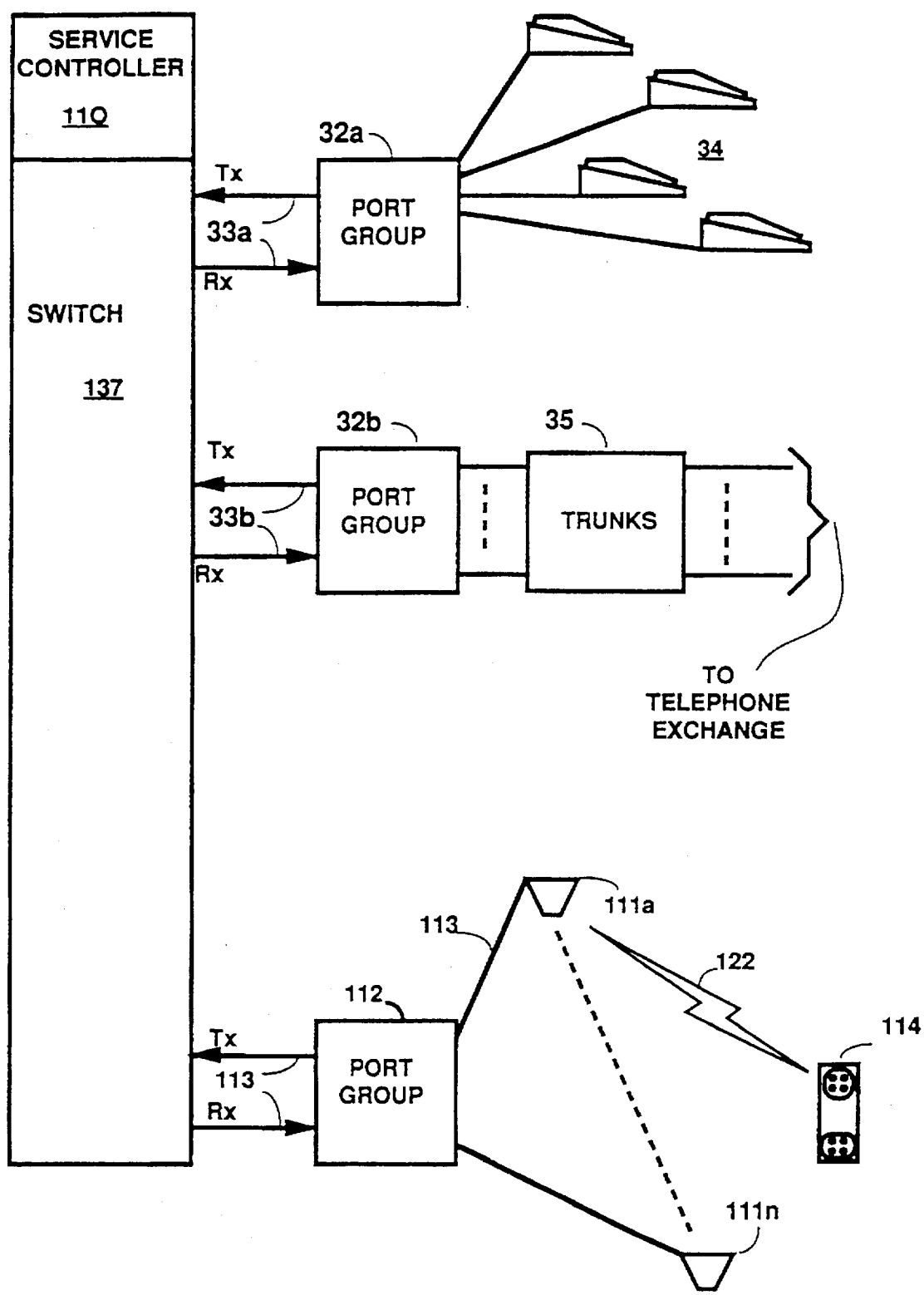
FIG. 1 is a block schematic diagram of a small digital telephone system which is operable to provide wireless telephony service in accordance with the invention.

The invention is exemplified within a small digital telephone system as illustrated in FIG. 1, which itself may be supported by either a central or branch exchange (not shown) via either analog or digital lines or trunks 35 connected therebetween. Conventional wireline telecommunication services may be provided for a plurality of station sets at 34 via a port group 32a connected to a service controller 110 via a switch 137 and by transmit and a receive lines 32b. The trunks 35 are similarly coupled as shown via a port group 32b and transmit and a receive lines 33b to the service controller 110. Radio base stations 111a –111n are connected similarly via a port group 112 and transmit and a receive lines 113, via a switch 137, to the service controller 110. Each radio base station provides a wireline interface and a radio link interface for coupling communications signals with a portable set 114 via a radio link 122. The radio base stations 111a–111n are loosely arranged into several groups, spaced apart one group from the other, each group being assigned to one of a plurality of geographic cells, somewhat as exemplified in FIGS. 4a and 4b. Spacing between the radio base stations in any cell may be in a range of a meter or so. The preferred number and spacing of radio base stations in any one cell is determined by the telephony traffic for which the cell is intended to serve.

Figure 2:
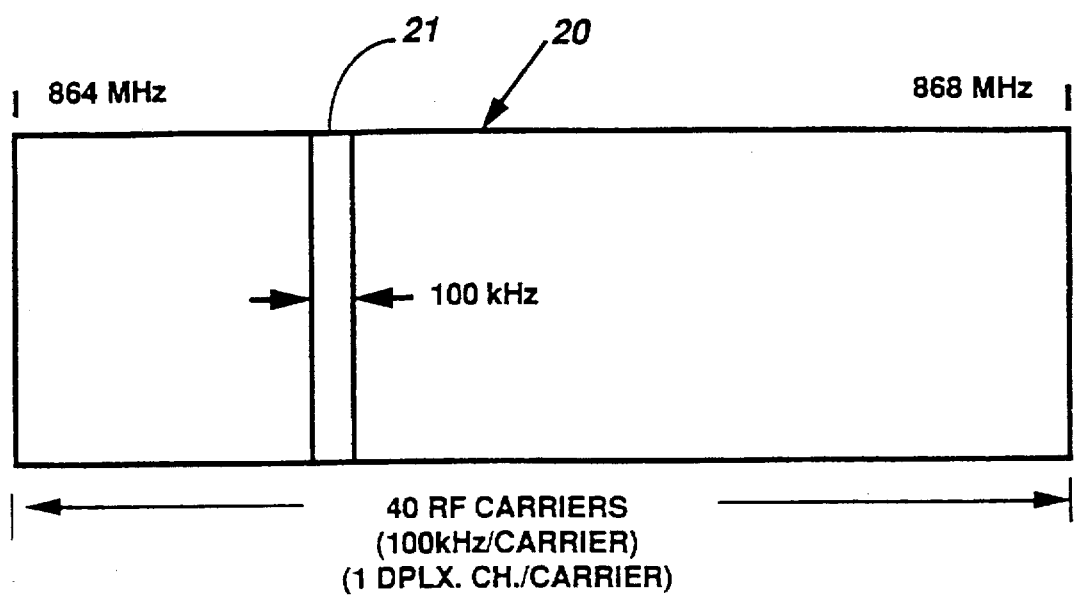
FIG. 2 is an illustration of the frequency plan for the Common Air Interface (CAI) CT2 standard.
Figure 3:
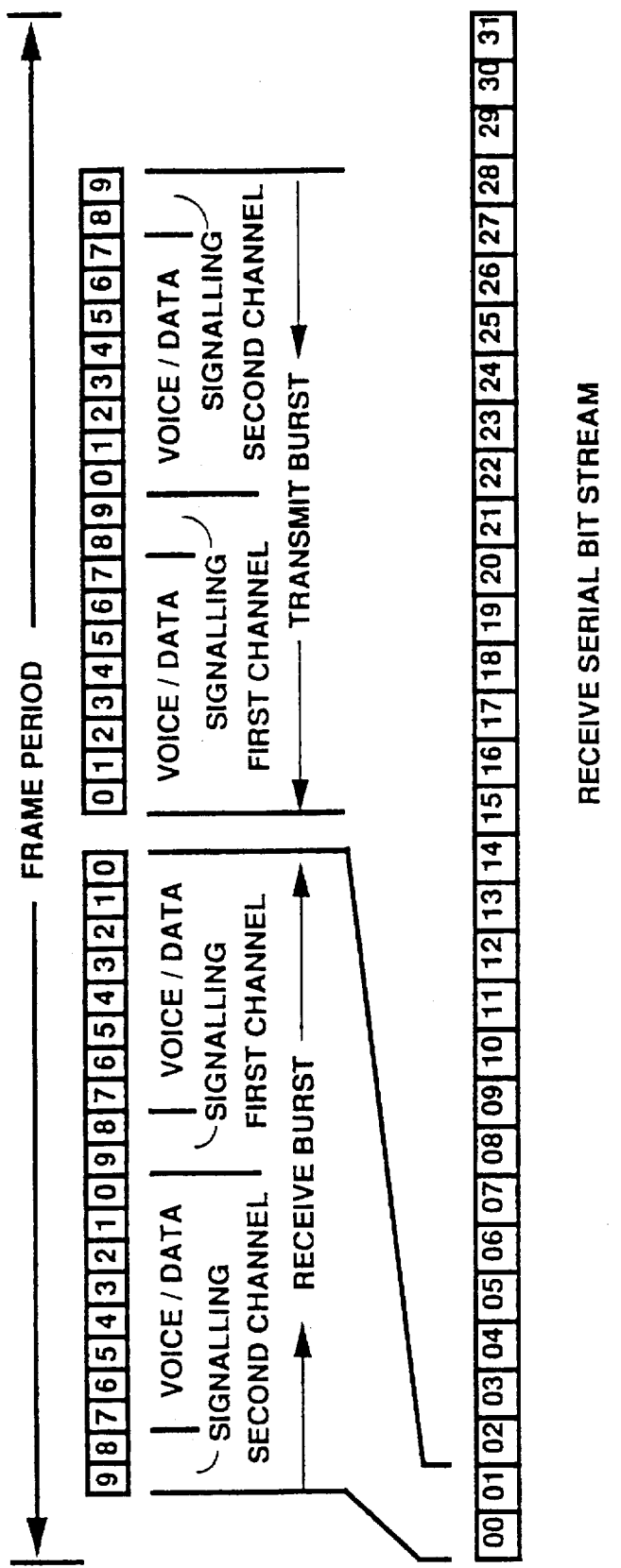
FIG. 3 is an illustration of a relationship between a time division multiplex signal format used in the small digital telephone system and a time compression multiplex (TCM) signal format also used in the small digital telephone system in FIG. 1.

As shown in FIG. 2, the United Kingdom CT2 standard calls for an operating spectrum of 864–868 MHz, i.e. a 4 MHz bandwidth indicated at reference numeral 20. Within this bandwidth 40 radio frequency carriers are defined, one of which is illustrated at 21. Each radio frequency carrier can be utilized as one full-duplex channel or radio link with a bandwidth of 100 KHz. In this example, each channel is provided in time-division duplex (TDD) operation. That is, one half-duplex time slot or burst of each frequency may be used for communication from the base station to a portable handset and a following half-duplex time slot or burst of the same frequency is used for communication between the portable handset and the base station. This technique is similar in principle to time compression multiplex (TCM) operation of wirelines, somewhat similar to that illustrated in FIG. 3, and is commonly referred to as "ping-pong". The wireline signal format provides transmit and receive bursts for first and second voice/data channels at 64 Kb/s. These are usually referred to as B-channels. The wireline signal format also provides first and second message channels of which only the first message channel is utilized at 8 kb/s in this example. Each of the transmit and receive bursts includes a balance bit and begins and ends with start and stop bits, not shown. Each wireline signal stream is interfaced with a predetermined pair of time slots in receive and transmit serial bit streams in the operating signal format of the service controller 110. Only the receive serial bit stream is shown in FIG. 3.

The telephone system illustrated in FIG. 1, behaves logically as though intelligence were distributed across the plurality of station sets 34, trunks 35, and the radio base stations 111a–111n as well as the service controller 110. This capability is achieved by combining a broadcast message architecture and a point to point message architecture so that functional messages facilitate control communication between intelligent entities and stimulus messages facilitate control communication with stimulus entities. Each of the radio base stations 111a–111n is in logical communication with the service controller 110. From the viewpoint of its logical structure, the physical smallness of the telephone system allows for liberties that may not be available in a much larger system. The logical structure behaves as if each telephone terminal and radio base station has its own processing power, generating and sending its own messages to every other terminal or station in the system.

Any portable telephone set intended for use in the CT2 standard and bearing an identity code which is of record in the service controller's data base, may receive telephone service. Instantaneous and running Received Signal Strength Indications (RSSI)s are provided from each radio base station for use in controlling functions related to initiation and maintenance of radio links with portable sets. In physical terms, in this example, although the instantaneous operating conditions of any radio link are ascertained by the operating radio base station, the decision processing power of the radio base stations is actually located in the service controller 110. As each radio base station is limited to supporting only one radio link at a time, there must be at least as many radio base stations as there are radio links to be maintained with portable telephone sets, at any one instant.

Figure 4A:
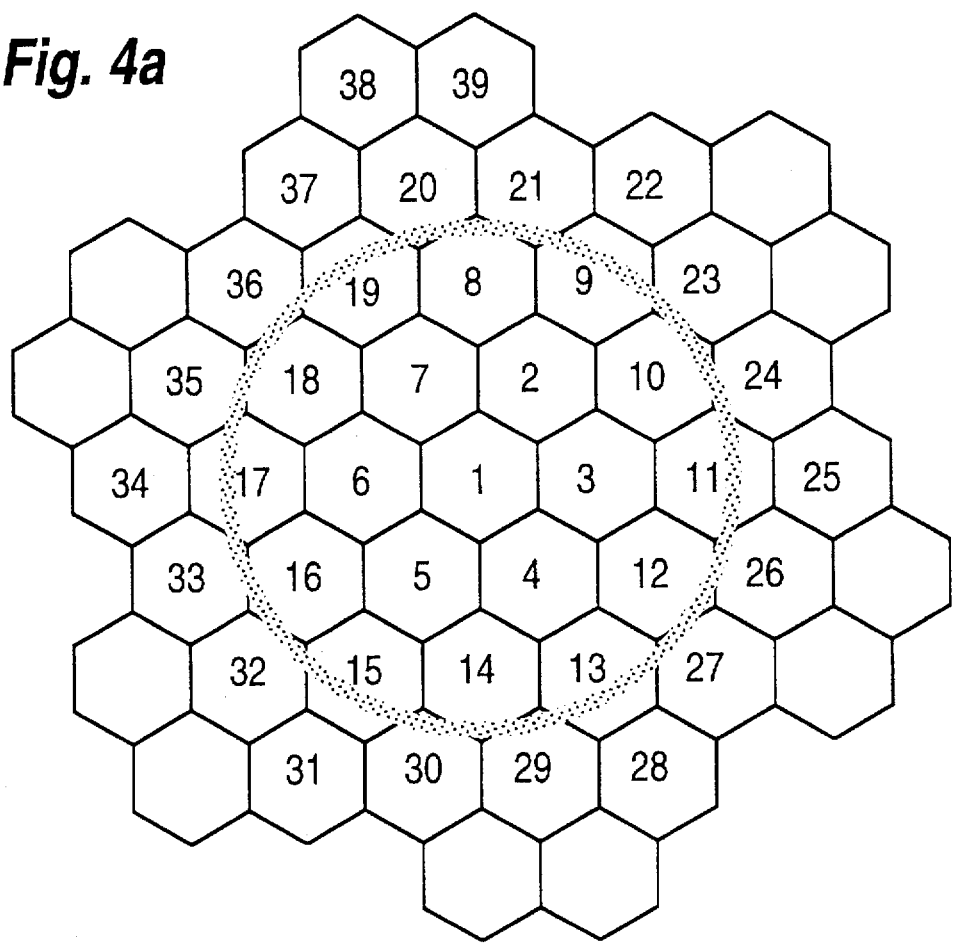
FIG. 4a illustrates one example of a functional micro-cell community which may be provided by the small digital telephone system illustrated in FIG. 1.

Mobile wireless connectivity in any given area is provided by dividing the geographic area requiring service into cells. Referring to FIG. 4a, a typical cell community structure used in providing a wireless service is illustrated. For convenience of illustration, the cells are portrayed as hexagonal areas, where in actual fact the boundary of a cell is defined as a line beyond which the propagation strength or power of a radio link is deemed to be too attenuated to maintain communications. This will result in a cell boundary of an irregularity somewhat like that as exemplified in FIG. 5a. O'Neill et al introduced the terms immediate neighbours and radio propagation neighbours. With respect to cell 1 of FIG. 4a, the immediate neighbours are cells 2, 3, 4, 5, 6 and 7. These are cells which share a common region or volume of operational traffic cell overlap, wherein mobility handoffs can occur therebetween. The radio propagation neighbours, cells 2–19 inclusive, are cells wherein one or more radio base stations might receive or see a radio link from a portable set even though the cell may be completely disjointed in terms of an operational traffic cell.

Portable user density in a limited radio channel spectrum is provided by channel reuse. In CT2, 40 channels have been allocated in the radio spectrum. Allocation/selection of a specific channel between a portable set and a radio base station is done using dynamic channel allocation (DCA). Although any of the 40 channels can be selected or allocated by a radio base station, in a real operating environment, not all 40 channels can be used in each cell simultaneously because of undue interference between adjacent channels, having regard for receivers of modest selectivity characteristics and modest cost. Hence it is unlikely that more than 21 channels may be simultaneously useful within a cell. The maximum number of channels which can be used in a cell is limited to the number of radio base stations provided in the cell. The number of channels actually useable for telephone communication in a cell is further limited by dynamic operating conditions. These include fading, multipath interference, adjacent channel interference, and channel occupancy by ancillary but essential functions such as beacon signal broadcasts and paging for selected portable set responses, as well as the normal signalling and supervision that accompanies typical call progresses and the maintenance and handoffs of radio links. In some areas, particularly public areas, portable sets tend to be highly mobile, in that there is frequent movement from one cell to another. However, on average, each portable set generates very little call traffic. If each portable set was required to update its location when entering another cell by responding to the beacon signal broadcast in the cell, the update supervisory traffic can be significantly out of proportion with respect to the actual call traffic. Hence for service in public areas, a reduction in the wireless facility and capital investment for a given number of portable telephone sets may be achieved with an acceptable grade of service by organizing groups of cells into mutually exclusive beacon signal broadcasting zones, each lying within a larger or broader paging area. Beacon signals broadcast from the cells of any one zone are arranged to be distinguishable from beacon signals broadcast from the cells of another zone. Hence a portable set which has previously identified itself and received a confirmation in one paging area will only again transmit its identity in response to having received a zone beacon signal associated with the beacon zone of another paging area. Of course this usually only happens when the portable set is carried into an adjacent paging zone. This method of operation frees up spectrum which can be used for telephone calls instead of being cluttered with responses to beacon signals by the usually idle telephones of the itinerant users. There is of course a trade off, in that when a portable set is paged it is preferable that it be paged from at least one radio base station in each cell of the paging area, as there is no way of knowing prior to the portable set responding as to which cell is most appropriate for establishing a radio link.

Figure 4B:
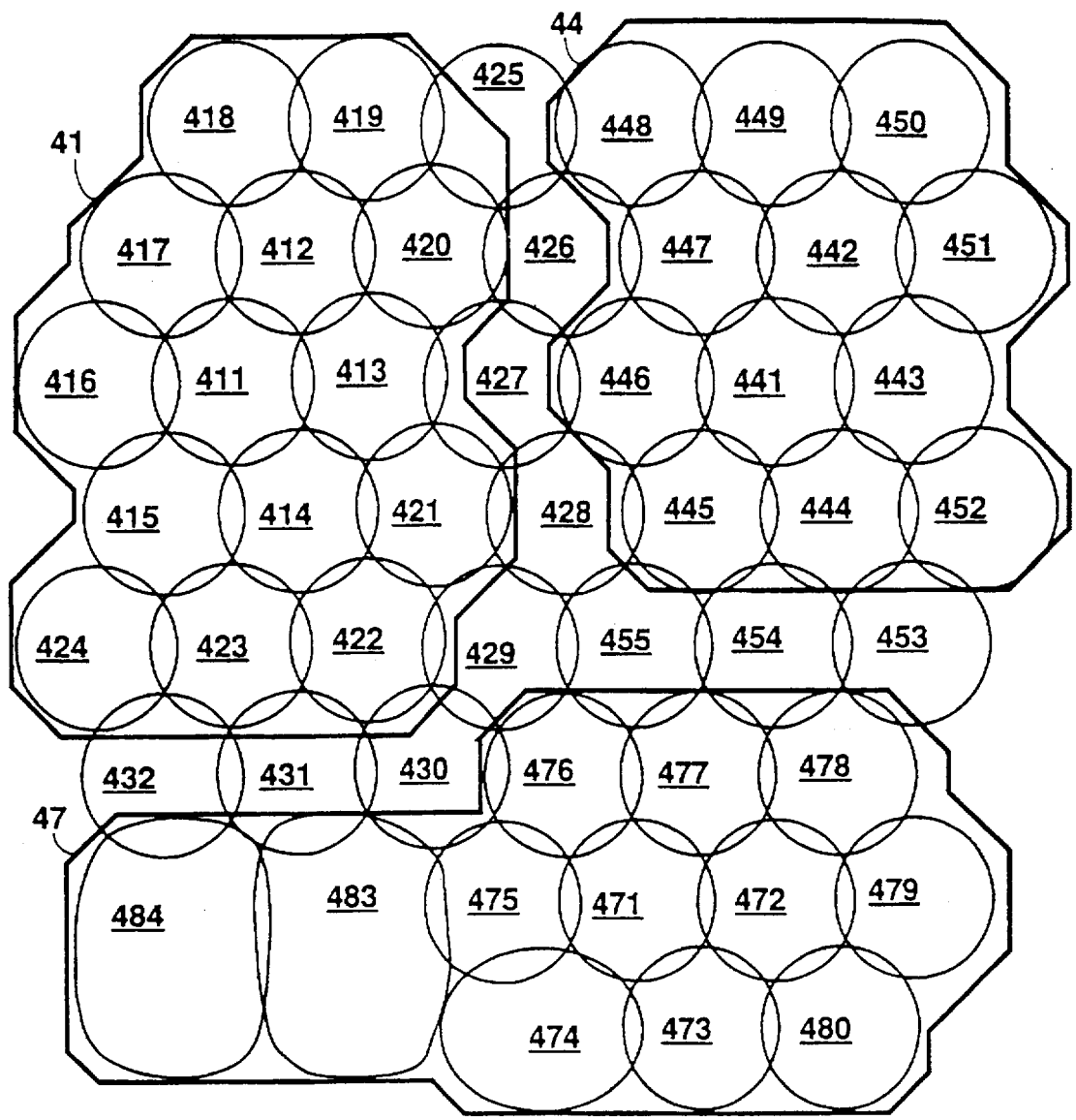
FIG. 4b illustrates another example of a functional micro-cell community which is particularly adapted, in accordance with the invention, for providing wireless telephony service for an itinerant user and which may be provided by the small digital telephone system illustrated in FIG. 1.
Figure 4C:
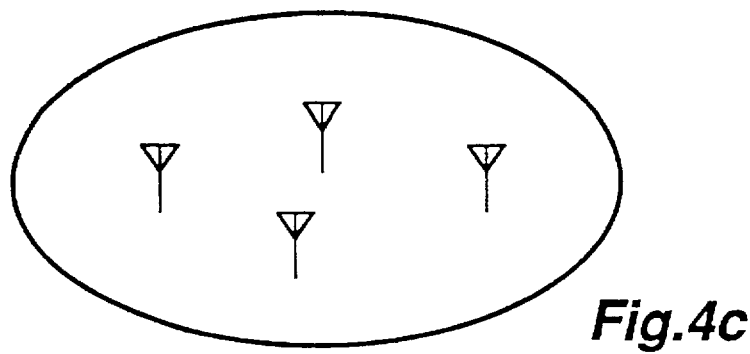
FIG. 4c is a symbolic illustration of a plurality of radio base station antennas for providing a typical cell as shown in FIG. 4b.

An example of a system being arranged into several paging areas each containing a beacon zone, is illustrated in FIG. 4b. First second and third paging areas 41, 44, and 47, each include a number of cells among which n radio base stations located in cells within a predefined zone are designated for beacon signal broadcasting and radio base stations within the remaining cells are not. The remaining cells define a buffer regions between the adjacent beacon zones. Each cell includes the antenna of one or more radio base stations. Hereinafter reference to the physical location of a radio base station should be understood to refer its antenna location. The buffer region is provided such that should a portable set be at an antenna location near the border or periphery of a beacon zone, it is unlikely to respond to the beacon signal of the adjacent beacon zone before having actually entered into the new beacon zone. In operation this arrangement has the effect of reducing unnecessary incidents of frequent reidentification and confirmation, referred to as thrashing.

The first paging area 41 includes a plurality of cells 411–432, and 453–455, from which paging signals may be transmitted. Within the first paging area 41, a first beacon zone consists of a lesser plurality of the cells, namely cells 411–424. The second paging area 44 includes a plurality of cells 441–455, and 425–432, from which paging signals may be transmitted. Within the second paging area 44 a second beacon zone consists of a lesser plurality Of the cells, namely cells 441–452. The third paging area 47 includes a plurality of cells 471–480, 483, 484, 425–432 and 453–455 which are transmitters of paging signals. Within the third paging area 47 a third beacon zone consists of a lesser plurality of the cells, namely cells 471–480, 483 and 484. As can be seen from the illustration, the paging areas overlap but the beacon zones are separated one from another by a boundary of at least one cell in width, to provide buffer regions. The beacon signal associated with each beacon zone is identified by a unique code reserved for this purpose. An example of a code format of the beacon signal is discussed later with reference to FIG. 7. In order that a portable set 114 be operable to be automatically registered in the service area of the service provider, it must be capable of distinguishing the beacon signal by its unique code. The broadcast of beacon signals in each of the first, second, and third paging areas 41, 44, and 47, is restricted to an otherwise idle radio base station in each of those cells within each of the first, second, and third beacon zones. As beacon signal broadcasts are of lesser priority than telephone communication or paging events, beacon signal broadcast occurrences in any one cell are generally periodic but may become intermittent as wireless telephone traffic increases. Also not all the otherwise idle radio base stations in any given cell need be regular transmitters of the beacon signal. In fact, beacon signal broadcasts from within any one cell need not be regular events. Time intervals of up to several minutes between beacon signal broadcasts are acceptable in normal operation.

Figure 7:
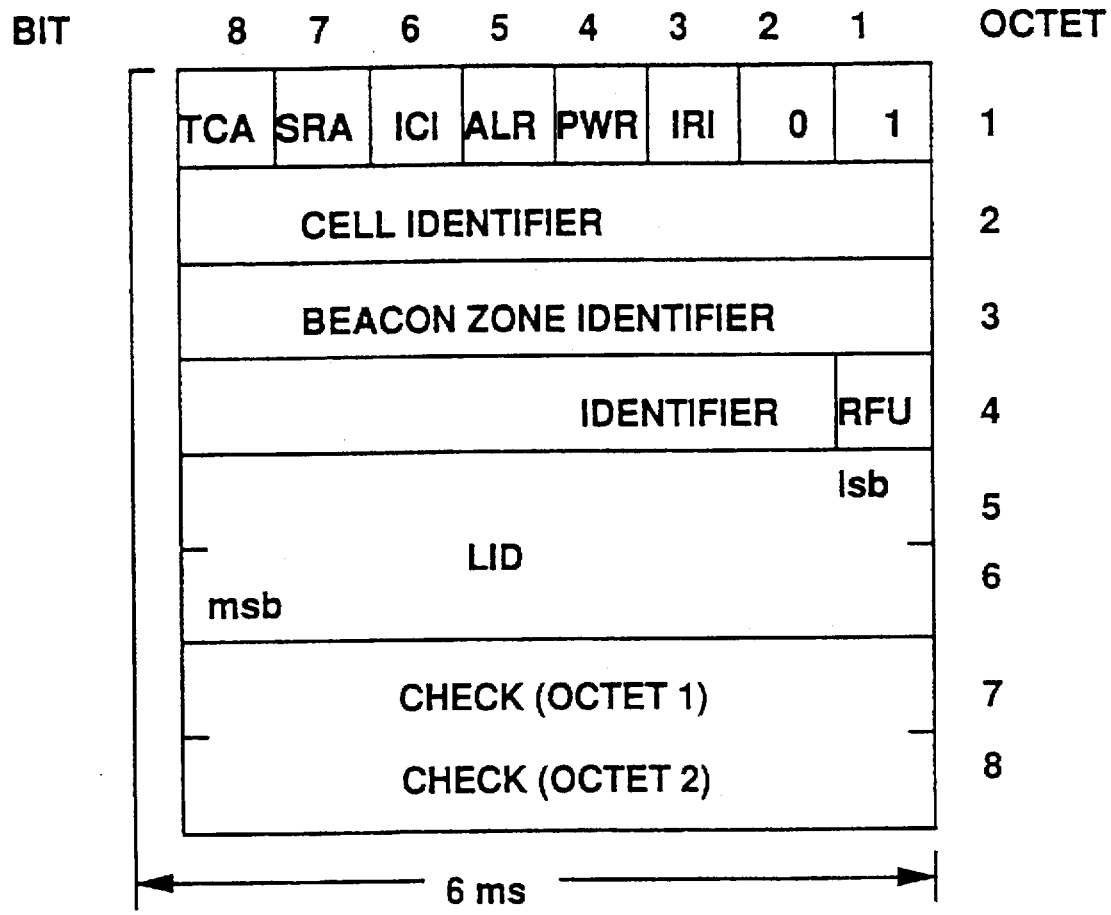
FIG. 7 illustrates an example of a code format suitable for providing a beacon signal compatible with operation as specified by the CT2 standard and useful in the operation of the telephone system in FIG. 1.

One example of the data format of the zone beacon signal is illustrated in FIG. 7, wherein the data consists of 8 octets (64 data bits), having a period of 6 milliseconds. The 8 octets are broadcast in a zone beacon signal from at least one radio base station in each cell in the beacon zone. The broadcast of the zone beacon signal from any one radio base station consists of a repetition of the data for a duration of 3 seconds every 30 seconds unless the broadcast of the zone beacon signal is preempted by call traffic.

Starting at the bottom of the diagram in FIG. 7, octets 7 and 8 are provided for checking or verifying that the preceding data has been correctly received at the portable set. Octets 5 and 6 are used to uniquely identify the wireless communications service provider. Bits 8-2 of the fourth octet are set to all 1s to indicate that the beacon signal is a secondary service signal broadcast from a radio base station and bit 1 is not specified as it is reserved for future use, (RFU). Octet 3 is used to uniquely identify the beacon zone from whence the signal is broadcast such that the portable set may recognize that it has been moved across a boundary from one beacon zone to another and be enabled to respond to the zone beacon signal. Octet 2 is used to uniquely identify the cell location such that the portable set may be enabled to indicate the cell from whence it has received the zone beacon signal, if and when it subsequently responds to the zone beacon signal.

Each of the bits in the first octet have an indicative function as follows:

bit 8, Traffic Channel Available (TCA), when set to 1 indicates that the radio base station from whence the signal is broadcast is available to provide a radio link for a telephone call;

bit 7, Signalling Receiver Available (SRA), when set to 1 indicates that the radio base station, from whence the zone beacon signal is broadcast, is functional for the purpose of receiving a response from a portable telephone set;

bit 6, Incoming Call Identification (ICI), when set to 1 indicates that there is radio linking and call set up information within octets 5 and 6 for the purposes of paging a particular portable telephone set, however in the case of a zone beacon signal this information is illogical and bit 6 is set to 0 for the purpose of instructing a receiving portable telephone set to interpret this information as the service provider's identity.

bit 5, Automatic Location Registration (ALR), when set to 1 enables the portable telephone set to automatically respond to a received zone beacon signal;

bit 4, Power (PWR), indicates one of two power levels with which a particular beacon signal was transmitted;

bit 3, In Range Indication (IRI), when set to 1 enables a receiving portable telephone set to provide an indication to the user that the portable telephone set is within the operating area of a wireless communications service provider; and bits 2 and 1 in this example are set to 0 and 1 respectively.

In the event that an itinerant wireless telephone user walks into one of the paging areas, paging area 41 for example, the user's portable set 114 will receive a beacon signal having been transmitted from one of the radio base stations on one of the available channels and which at the moment the receiver in the portable set 114 coincidentally was scanning. Upon recognizing the unique code of the beacon signal, the user's portable set 114 responds by transmitting its own unique identity. This scenario may repeat as many times as needed until the wireless system responds with a broadcast of confirmation that the presence of the portable set 114 is recorded for service. Thereafter the portable set 114 need not respond to beacon signal broadcasts identified with the same unique code for at least some extended period of time which may extend over several hours. Subsequently wireless telephony service is available to the itinerant wireless telephone user generally as disclosed by O'Neill et al, with the exception that the portable set's instant whereabouts is not actively tracked on a cell by cell basis but merely assumed to be within the paging area containing the beacon zone within which the portable set 114 has been recorded. Only in the event that the portable set 114 happens to receive a different beacon signal will the user's portable set respond by attempting to again record its presence with the wireless telephone system. Receipt of the new beacon signal is indicative that the user has entered a different paging area, paging area 47 for example, and that any subsequent paging will be restricted to the paging area 47. The wireless telephone system responds to any incoming call destined for a user having been recorded with the system by broadcasting a paging signal identifying the user's portable set 114 preferably from at least one radio base station in each of the cells in the paging area. The paging signal may be broadcast several times from each of the cells, until the appropriate response from the user's portable set 114 is received. This response need not be received in the cell in which the user is actually located in order that a radio link be initiated. All the radio base stations in the cell where the user's portable set 114 is present may already be occupied with radio links or the channel scanning of the user's portable set 114 may have been coincident with the broadcast of the paging signal from an adjacent cell. In any event a radio link will be established and subsequently optimized within prevailing mobility operating parameters and constraints of the wireless telephone system.

Figure 5A:
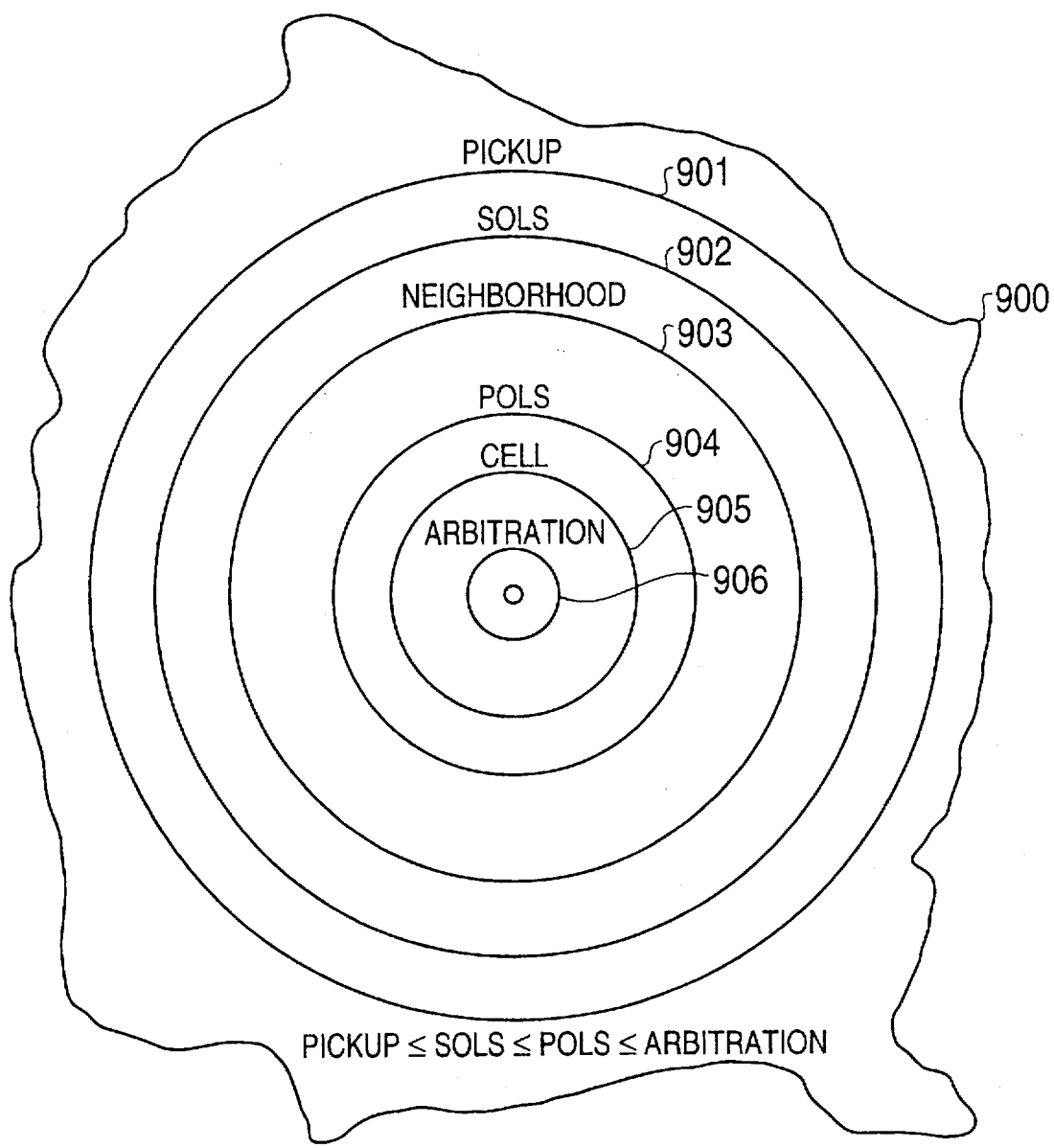
FIG. 5a shows the relationship between the thresholds associated with establishing and maintaining a radio link.
Figure 5B:
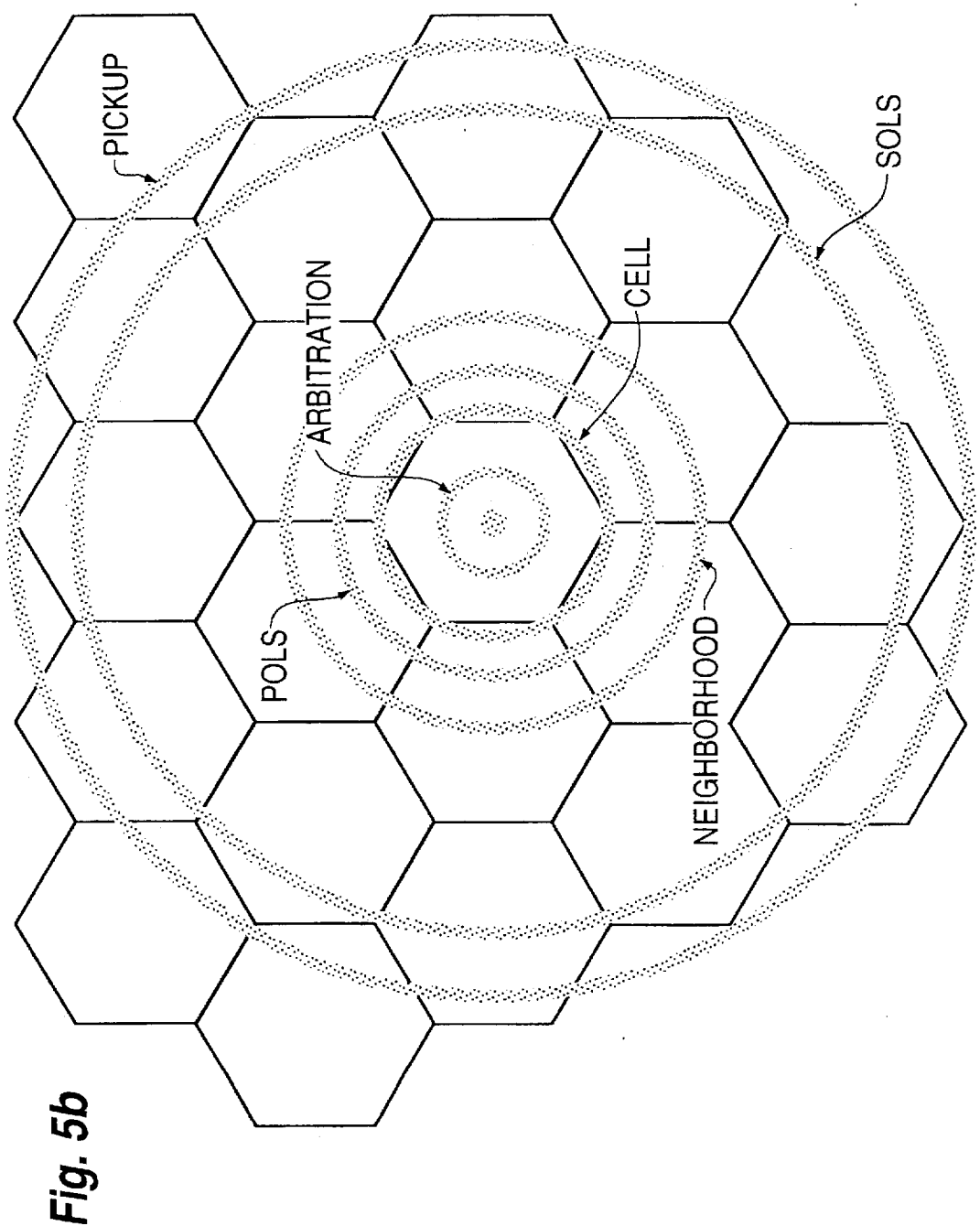

The set up and maintenance of radio links with portable sets throughout the service area of the wireless telephone service provider is effected by comparisons between receive signal strength indications (RSSIs) of the radio base stations and selected signal quality thresholds. As shown in FIG. 5a, a typical radio propagation area 900 of a cell varies significantly from the stylized hexagonal shape portrayed in FIG. 4a. FIG. 5b shows the same thresholds, but with respect to a cell in the cell community. The various thresholds used are:

a) Pickup threshold;
b) Switch Originated Link Setup (SOLS);
c) Neighbourhood threshold;
d) Portable Originated Link Setup (POLS);
e) Cell threshold; and
f) Arbitration threshold.

a) Pickup threshold:

Any radio link which initially has a RSSI level below the pickup threshold 901 is not accepted by the radio base stations. This would typically reflect a Radio Signal Strength Indicator (RSSI) level below which voice quality would experience serious degradation and the link would be at high risk of being dropped.

b) Switch Originated Link Setup (SOLS):

The Switch Originated Link Setup (SOLS) threshold 902 is used by radio base stations during switch originated calls. The radio base stations will not accept an call set-up response from a portable terminal unless an RSSI level is greater than the SOLS threshold. The purpose of this threshold is to prevent very weak links from preempting establishment of a stronger link which may be available in another cell. In an ideal situation, this threshold will approach the maximum radio propagation range.

c) Neighbourhood threshold:

The neighbourhood threshold 903 has an RSSI level which is only known to the service controller. It is used to determine the search neighbourhood during link set up arbitration and mobility. When the RSSI level is less than this threshold, the radio propagation neighbourhood is used, otherwise the immediate neighbourhood is used.

d) Portable Originated Link Setup (POLS):

The Portable Originated Link Setup (POLS) threshold 904 is used by the radio base station during portable originated calls. The radio base station will not respond to the portable if the RSSI level does not meet the POLS threshold. The purpose of this threshold is to increase the probability of a good link being established immediately with the portable.

e) Cell threshold:

The cell threshold 905 coincides with the installation (provisioning) boundary. It is not used by the radio base station explicitly, but is used during a lost portable recovery to help determine the need for an intra-cell or inter-cell search. The cell threshold defines the traffic cell.

f) Arbitration threshold:

Arbitration is a process of attempting to establish a better radio link than an existing radio link. The arbitration threshold 906 is one where the RSSI level is very good and a better radio link for serving a specific portable would have little added benefit.

Furthermore dynamics of RSSI rates of variation may be advantageously utilized to recognize and distinguish between mobile and stationary portables for maintenance of radio links. A fast handoff response may be provided for a portable set user who is walking away from a cell center, while a slow handoff response is provided for a stationary user. This dynamic assignment of the slower handoff response maintains adequate radio links for stationary portables and permits optimal control resources to be concentrated upon maintaining acceptable radio links with mobile portable set users.

At the time of installation, in preparation for operation, the service controller 110 is provided with a definition of each of the paging areas and its associated beacon zone in the form of first, second, and third memory lists of logical addresses of cells in the first, second, and third paging areas. As shown in FIG. 8, each of the memory lists consists of a paging area list which includes a beacon zone list. When a user's portable is recorded as being within a beacon zone, any subsequent paging for the portable set is limited to the cells of the paging area as defined by the paging area list.

During normal operation, the system causes a beacon signal to be transmitted from time to time by a radio base station in each cell of each beacon zone. If the user crosses from one beacon zone to another and the user's portable set is idle, the portable set responds to having received a new beacon signal by again transmitting its unique code to effect a new recordation of its presence, after which it receives confirmation of being recorded.

Frequent and unnecessary occurrences of recordation, herein termed as thrashing recordations, may be deleterious to the operation of the system because these functions consume substantial real time in the service controller 110 and also unnecessarily occupy radio spectrum bandwidth. Having a buffer of at least one cell width between each of the beacon zones substantially reduces the likelihood of thrashing recordations between any two beacon zones. Potential for thrashing can also be reduced by careful geographic planning such that the edges of beacon zones do not coincide in a more or less parallel relationship with a location that many portable user's may frequent, such as a main thoroughfare. However, as this is not always convenient, other precautions can be taken to further reduce instances of thrashing. For example, the portable set may be arranged to require consistent reception of similar beacon signals for a period of more than a minute of time without receipt of any other beacon signal, before attempting to make record of its presence within the paging area. Alternately, the service controller 110 may include a recordation inhibit instruction along with a confirmation of recordation whereby the portable set is caused to ignore any beacon signals for a period of time which may extend up to 5 minutes or so.

Figure 6A:
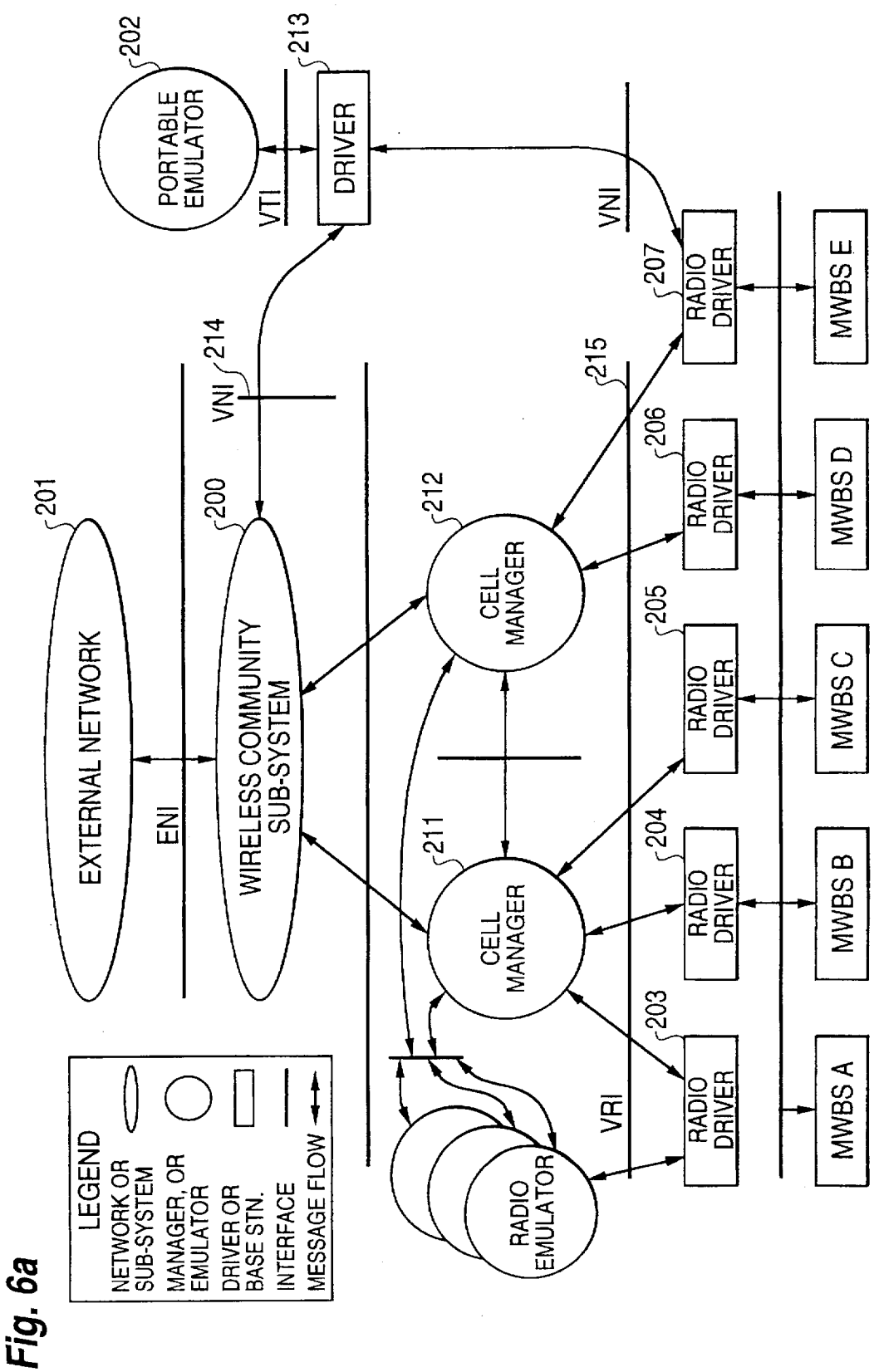
FIG. 6a illustrates a software architecture used in a service controller within the small digital telephone system in FIG. 1.

Referring to FIG. 6a, the software architecture of the service controller 110 is illustrated in relation to interaction between functional entities located in a community sub-system 200. The wireless community sub-system 200 interfaces with an external network 201 using a functional message protocol via a D-channel. This interface is referred to as the External Network Interface (ENI). The wireless community sub-system 200 is responsible for maintaining centralized control over the entire cell environment. The functional entities of the wireless community sub-system 200 provide mobility services to cell managers 211 and 212, portable emulators 202, and the external network 201. The cell managers are provided with logical addresses (LADs) and interact with a physical group of radio base stations which provide a specific coverage area. The cell manager 211 controls radio drivers 203, 204, and 205 of radio base stations A, B and C, respectively, whereas the cell manager 212 controls radio drivers 206 and 207 of another group of radio base stations, D and E, respectively. Cell managers use the functional signalling protocol to communicate information to each other. The portable emulator 202 and driver 213 will link up to a radio driver during a radio link with a portable. This link is dynamic and only exists during a call, once a call has been set up.

Figure 6B:
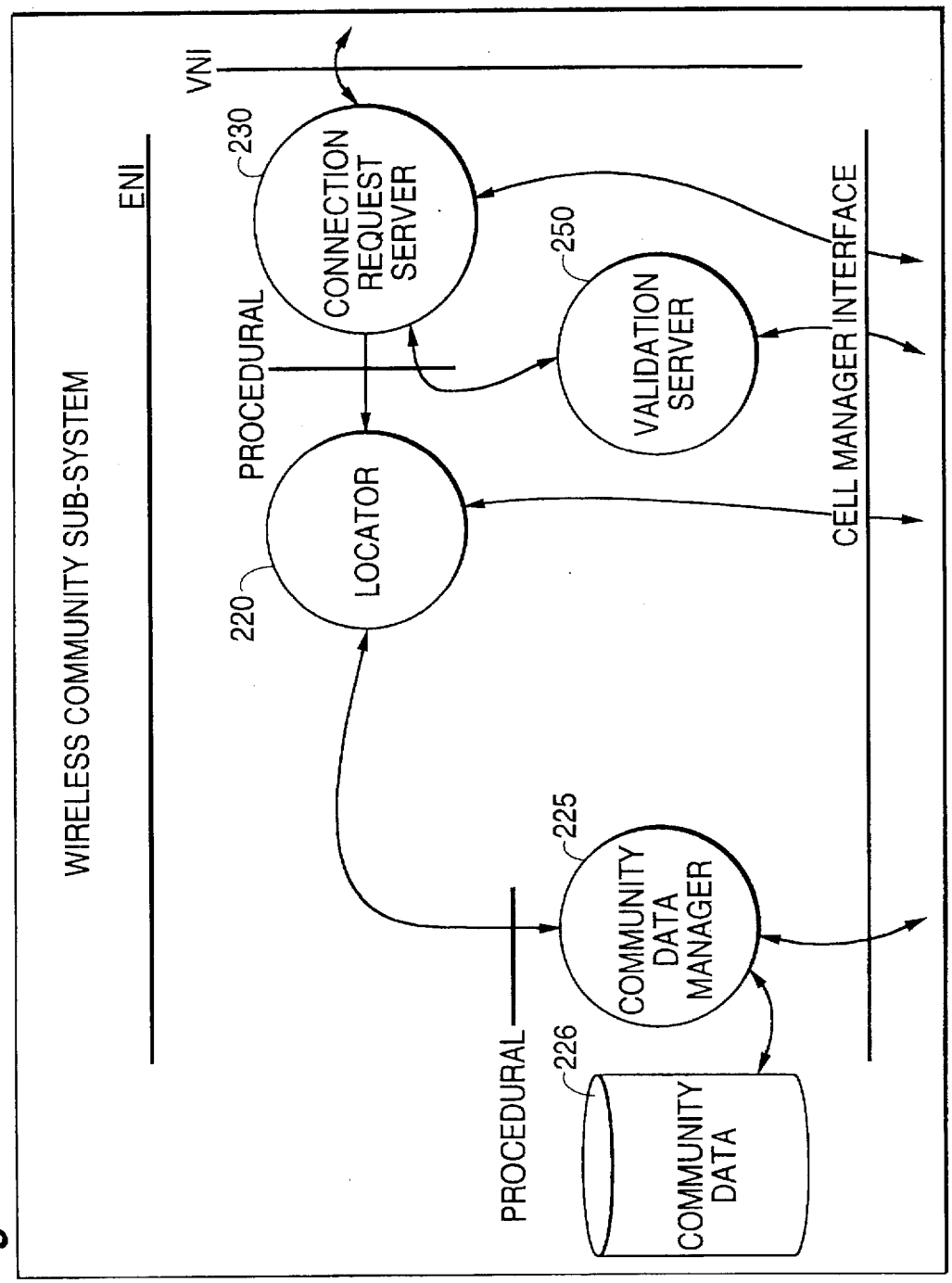
FIG. 6b shows a cell manager's functional partitioning during an arbitration function.

The virtual network interface (VNI) 214 between the portable driver 213 and community sub-system 200 is provided by the connection request server 230 in FIG. 6b. This interface is procedural and provides the link originate and link reject functionalities, for example, request from the portable driver 213 to find a portable, acceptance of the portable set's identity, response from the connection request server to the portable driver when link request as failed, etc. A virtual radio interface (VRI) 215 is the interface between the cell managers and the radio drivers.

FIG. 6b shows a software architecture of the community sub-system 200 of FIG. 6a. The community sub-system's functional entities include a locator 220, a community data manager 225 which has access to the community database 226 wherein the memory list is stored, a connection request server 230 and a validation server 250.

The locator 220 is responsible for finding a recorded called portable set within a minimum duration of time after arrival of an incoming call. In general, the locator maintains a record of the last paging area in which each portable set was present. It tries to locate a specific portable set upon arrival of an incoming call by broadcasting a paging signal identifying the called portable set in the paging area. If the portable set does not respond within a short time, the call progress may be diverted to provide the calling party with an appropriate service tone or announcement, or the call progress may simply be returned to the associated external facility.

Figure 9:
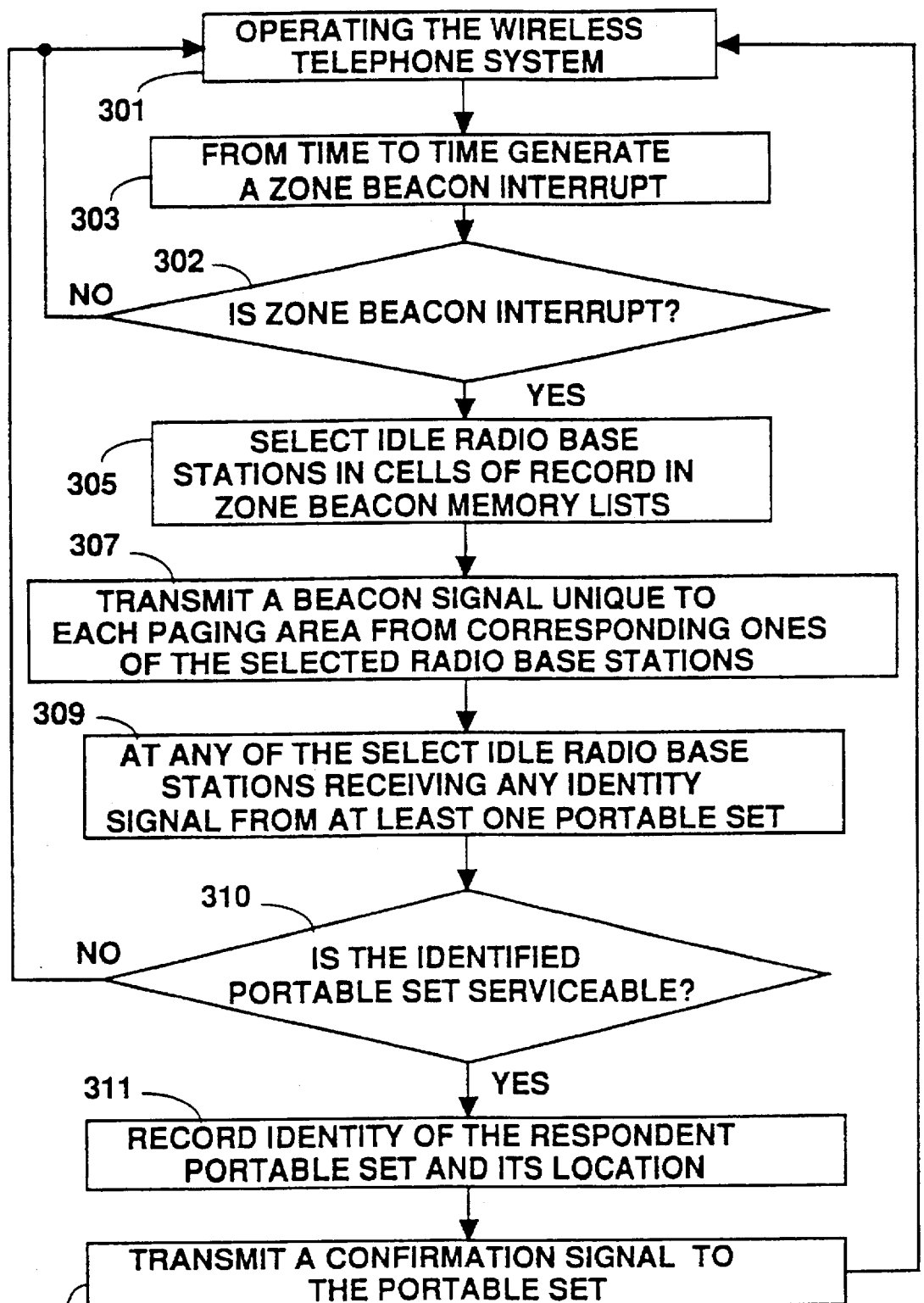
FIG. 9 is a flow chart illustration of a recordation process used to make record of the presences of a portable telephone set within an operating service area of the telephone system illustrated in FIG. 1.

FIG. 9 is a flow chart illustration of the recordation process required in the telephone system, to make record of the presence of a portable telephone set within the service area of a wireless telephony service provider. As indicated in function box 301 these functions are required to be executable during the normal operation of the telephone system, normal operation including the basic tasks such as monitoring for requests for service etc., via line links and air links. At any time during which the recordation function is waiting for the results of a physical action such as the actual radio transmission or radio reception of a signal, the normal operation of the telephone system continues until the required results are signalled to the service controller 110.

As is typical of telephony switching operations, the service controller 110 is directed in its operations in accordance with predetermined priorities of interrupt events which may take priority over some or all of the basic tasks. At intervals of a minute or so, a zone beacon interrupt is generated, as indicated in a function box 303. In the event that there are no immediate interrupts of higher priority, the service controller determines if an unserviced zone beacon interrupt exists, as shown in decision box 302. If NO, the normal operation of the telephone system continues. If YES, however, the service controller refers to its busy/idle map (not shown) in combination with its zone beacon memory lists as exemplified in FIG. 8 to select idle radio base stations for subsequent radio transmission of the zone beacon signal, as specified in a function box 305. This selection may include all idle radio base stations in every cell within a beacon zone or it may be limited to some lesser number of the radio base stations. It is preferable that at least one radio base station in each of the cells is selected. Function box 307 requires that each selected radio base station transmits a beacon signal which is identifiable by any receiving portable as being associated with the beacon zone wherein the radio base station is physically located. Thereafter, any idle radio base station is available to receive a response signal from a portable telephone set as indicated in function box 309. When a response signal bearing the identity of a portable telephone set is received, the identity of the portable telephone set is compared with the data base of registered identities to determine if the portable telephone set is properly serviceable by the service provider, as indicated in a decision box 310. If YES in relation to at least one response signal, the identity of the responding portable telephone set is recorded in association with the paging area in which the receiving radio base station is physically located. Thereafter a confirmation signal is transmitted via the radio base station, as indicated in a function box 313, whereby the portable telephone set is intended to be nonresponsive to subsequent beacon signals of origin within the same beacon zone. After transmission of the confirmation signal, the recordation process is complete for the moment while the normal operation of the wireless telephone system continues. If NO is determined in the decision box 310, the recordation process ceases for the moment while the normal operation of the wireless telephone system continues.

Figure 10:
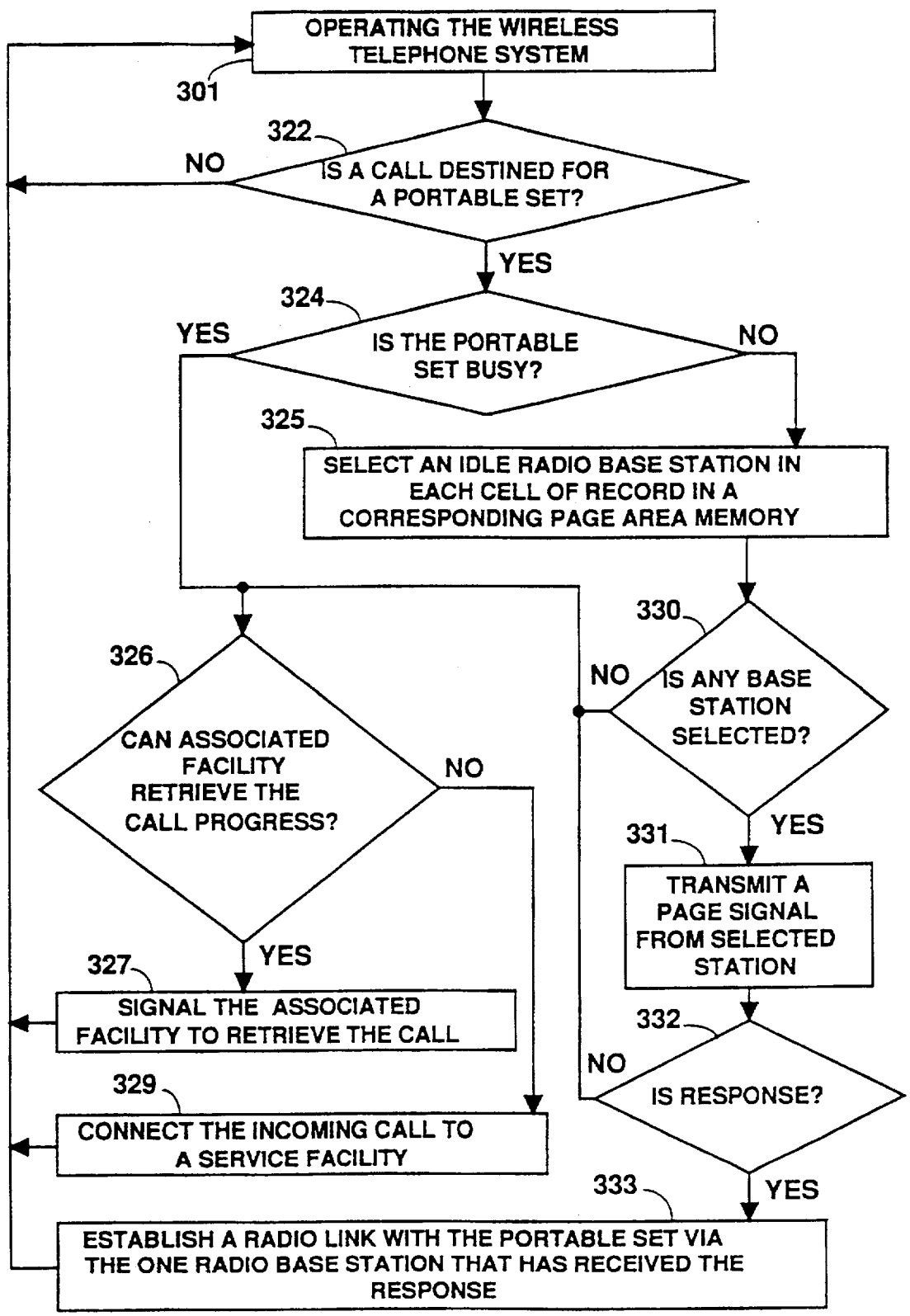
FIG. 10 is a flow chart illustration of an initial part of a call setup process as it is adapted for operating in conjunction with a paging area as exemplified in FIG. 4b.

FIG. 10 is a flow chart illustration of an initial part of the call set process as it is adapted to operating in conjunction with a paging area of the wireless telephone system. During normal operation as indicated in the function box 301, the service controller may receive a call set up request. For example the request may be received from another telephone facility via the port group 32b, shown in FIG. 1. As the system is intended to be primarily functional as a wireless telephone system, an identity of the called party is compared with identities associated with portable telephone sets recently recorded as being within any of the paging areas, as required in a decision box 322. If NO correspondence is found with a called party's portable telephone set, the service controller processes the call set up request in typical wireline telephony manner. If YES, the service controller refers to its busy/idle map to determine if the identified portable telephone set is busy or not, as indicated in decision box 324. If the called set is not busy, as indicated in a function box 325, the service controller 110 selects an idle base station in each of the cells indicated in the paging area list of last recorded presence, to the extent that any existing wireless telephone traffic allows. If at least one idle base station is selected, as determined in a decision box 330, the service controller 110 attempts to complete the call set up. The service controller 110 directs the radio base station or stations as selected to transmit a page signal identifying the called portable telephone set. As shown in a decision box 332, if an appropriate response is received, a radio link is established with the called portable set via the radio base station having first indicated to the service controller that it has received the response, in accordance with the requirement of a function box 333. Thereafter the operation of the wireless telephone system may include optimization of the established radio link, for example, in a manner as disclosed in the previously mentioned application by O'Neill et al.

If however the portable telephone set is found to be busy at the decision box 324, or that an idle radio base station is not available at the decision box 330, or there is no response from the paged portable telephone set at the decision box 332, it is concluded that the call cannot progress to the called portable. In this case the feature parameters of the telephone facility from whence the call set up request was communicated are determined in accordance with a decision box 336 to see if said facility is able to retrieve the call progress from the wireless telephone system. If it can, signalling appropriate for this function may be generated by the service controller and transmitted via the group port 32b, as indicated in a function box 327. If not, the call may be completed to a service facility, as indicated in function box 329 which may, for example, provide an audible progress tone to the calling party, or may offer a voice messaging opportunity to the calling party.

Variations of the principle of operation of an exclusive beacon zone within each of a plurality of larger overlapping paging areas to provide wireless telephone service in areas of high portable set mobility and low call traffic, will be apparent to persons of typical skill in view of the foregoing description. Wireless telephone service in public areas is usually characterized by high portable set mobility and low call traffic. It is believed therefore that the invention as herein defined in the claims will find advantageous use in the provision of low power, publicly accessible, wireless telephone service in areas such as transportation terminals supermarkets, department stores, shopping malls, or any large publicly frequented facility under a unitary management authority such as museums, art galleries, zoos, exhibition facilities, and sports stadiums.

What is claimed is:

1. A digital telephone system for providing communication paths between station sets of calling and called parties, wherein the station sets may include portable telephone sets, whose presence are of record within the digital telephone system and may include an itinerant portable telephone set, whose presence may not normally be of record within the digital telephone system, and wherein a communication path associated with any portable telephone set includes a radio link between the portable telephone set and any one of a plurality of radio base stations, each of which is connected by a communications conduit to the digital telephone system, the digital telephone system comprising:

a port circuit for interfacing an operating signal format of the communications conduit with an operating signal format of the digital telephone system, the operating signal format of the communications conduit including a bidirectional message channel and at least one bidirectional communication channel, and the operating signal format of the digital telephone system including frame organized channels;

a service controller for receiving and transmitting message signals via the frame organized channels; and a switch being responsive to the service controller for transferring communication signals from a frame organized channel of any one port to a frame organized channel of any other port;

wherein the service controller includes a plurality of cell managers each being responsive to message signals received from any of the radio base stations for causing one of the radio base stations to maintain a radio link with a portable telephone set of record of a calling or called party, a plurality of zone lists, each zone list defining a beacon zone and having stored therein an identity of at least one radio base station having been selected from the plurality of radio base stations, the beacon zones defined by the zone lists being separated by a buffer zone having at least one radio base station, a plurality of paging lists, each paging list having stored therein a corresponding one of the zone lists, and in addition thereto an identity of the at least one radio base station from the buffer zone, and means for causing a beacon zone signal to be radio transmitted from time to time via at least one of the radio base stations, for soliciting a radio transmitted response, including an identity, from any itinerant portable telephone set, whereby an itinerant user of wireless telephone service may be unaware of an available low power wireless telephone service and may yet be a recipient of a telephone call routed via the digital telephone system.

2. A telephone system for providing wireless telephone services for itinerant users of wireless portable telephone sets via a plurality of ports, each port transferring communications signals between one of a plurality of radio base stations and one of a plurality of channels in an operating signal format of the telephone system, comprising:

(a) a plurality of cells, each cell having one or more radio base stations, said plurality of cells being partitioned into a plurality of beacon zones, each of said beacon zones comprising at least one cell, and a buffer zone which separate said beacon zones from one another, said buffer zone comprising at least one cell;

(b1) a service controller for causing radio base stations which are idle and located within one of said beacon zones to radio transmit a zone beacon signal including a repetitive recordation solicitation from time to time, (b2) the service controller being responsive to signalling received in response to the recordation solicitations, recording an identity of a responding portable telephone set, and radio transmitting a zone confirmation of said recordation via a radio base station from which the signalling was received, (b3) the service controller being responsive to a request for service in which said responding portable telephone set is identified as being a called party by causing paging signals to be transmitted from radio base stations which are idle and located within the same beacon zone as said base station from which the signalling was received and from at least one more radio base station which is idle and located within said buffer zone, (b4) the service controller thereafter selecting one of the radio base stations at which an answer to the paging signals was received for establishing a radio link with said responding portable telephone set, (b5) the service controller restricting only one radio base station in each cell to radio transmit the zone beacon signal from time to time; and (c) switch means responsive to the service controller for providing a communication path via a port channel associated with said radio link;

(d) whereby an itinerant user of wireless telephone service may be unaware of an area of low power wireless telephone service and yet be availed of a low power wireless radio link.

3. A telephone system as defined in claim 2 wherein the service controller includes a plurality of cell managers each for controlling functions within a cell.

4. A telephone system as defined in claim 2, wherein a reception characteristic of the radio base stations defines geographical operating limits of said beacon zones and said paging area.

5. A telephone system as defined in claim 3 wherein each cell manager includes means responsive to signal strengths as received from time to time at any of its radio base stations for transferring a radio link to another of its radio base stations if said another of the radio base stations has received a greater signal strength from a portable telephone set than a radio base station which is radio linked with said portable telephone set.

6. A telephone system as defined in claim 3 wherein each cell manager includes means responsive to signal strengths as received from time to time at any of its radio base stations for acting in concert with another cell manager to effect a handoff of a radio link with a portable telephone set to one of the plurality of radio base stations in a neighboring cell.

7. A telephone system for providing wireless telephone service for portable telephone sets including portable telephone sets of itinerant users who from time to time may enter, linger, traverse, and depart an area of operation of the wireless telephone system, the wireless telephone system comprising:

a plurality of radio base stations, each station being capable of supporting a radio link for communications with a portable telephone set;

at least two groups organized from some of the plurality of radio base stations, each group having a beacon zone and a buffer zone, the buffer zone consisting of at least one radio base station in common with at least one other group and separating the beacon zones of the respective groups;

switch means for completing paths of communication with any of the radio base stations, and a service controller including
means for soliciting a recordation response from time to time via radio base stations inside the beacon zones,
means for recording a presence of a responding portable telephone set of an itinerant user as being within a service area of one of the groups, and
means responsive to a call request to the itinerant user, for paging the responding portable telephone set via the radio base stations of a group within which the responding portable telephone set is present, whereby the portable telephone set of the itinerant user may be called via the telephone system even though the itinerant user may be unaware of an available low power wireless telephone service.

8. In a wireless telephone system having first and second groups of cells separated by a buffer group of cells for wireless communication with portable telephone sets each having a preassigned identity, wherein each of the cells includes a plurality of radio base stations, any one of which is operable to initiate provision of a radio link with a portable telephone set over any one of a plurality of radio frequency channels, by first broadcasting a paging signal for identifying the portable telephone set, from at least one of the radio base stations on at least one vacant radio frequency channel, wherein a portable telephone set which has been identified is operable to complete the radio link by responding to the paging signal, a method by which the wireless telephone system may provide service to an itinerant portable telephone set having entered an area wherein wireless telephone service is available via the wireless telephone system, the method comprising the steps of:

i) from time to time radio transmitting a plurality of interrogation signals from a radio base station in each cell of the first and second groups, whereby an unrecorded portable telephone set is invited to transmit its identity to the wireless telephone system;

ii) in response to having received a signal from said unrecorded portable telephone set at one of the radio base stations, recording the unrecorded portable telephone set as being availed of telephone service and broadcasting a confirmation signal from the radio base station, the confirmation signal identifying the wireless telephone system, iii) in response to the wireless telephone system receiving a request for a call completion to a portable telephone set, broadcasting a paging signal from an idle one of the radio base stations in each cell of the first, second and buffer groups; and iv) in the event of a radio signal broadcast response from the portable telephone set has been received at one of the radio base stations, initiating a radio link with the portable telephone set via said one of the radio base stations, and in the event of a failure to receive a response from the portable telephone set, deleting the identity of the portable telephone set from the wireless telephone system.

9. A method as defined in claim 8 wherein the signal broadcast in step ii) includes an indication of a limited period for recordation, and after the limited period expires, an identity of the unrecorded portable telephone set is not recorded in the wireless telephone system.

10. In a telephone system having a plurality of cells for wireless communication with portable sets each having a preassigned identity, wherein each cell includes a plurality of radio base stations, any one of which is operable to provide a radio link with a portable set of either a calling party and a called party over any one of a plurality of radio frequency channels, a method of establishing a call between a radio base station and a portable set within an operating area of one of the cells, wherein an originating radio link may be established, from a radio base station, with a portable set of an itinerant called party, said method comprising the steps of:

i) positioning at least one of the radio base stations between two zones, each of said zones including at least one cell with at least one radio base station such that the two zones have mutually exclusive boundaries of effective operation and an overlapping boundary of effective operation including said at least one of the radio base stations;

ii) in each of the zones, from time to time broadcasting distinct interrogation signals, whereby an unrecorded portable set of an itinerant party is invited to transmit an identity signal to the telephone system;

iii) responsive to an identity signal which is acceptable to the telephone system, making record of a presence of the portable set of the itinerant party and the zone within which the itinerant party is present; and thereafter a) receiving an incoming call request wherein the itinerant party is a called party;

b) selecting radio base stations having vacant radio frequency channels in the zone within which the itinerant party is present and in said overlapping boundary of effective operation of said zone;

c) broadcasting a radio signal including a coded message corresponding to the preassigned identity of the called portable set in at least one vacant radio frequency channel of each selected radio base station;

d) after each radio signal broadcast, monitoring said at least one radio frequency channel for a portable set response broadcast which includes an identity of the called portable set;

e) receiving the portable set response broadcast at a first radio base station, and if the portable set response broadcast is of a receive signal strength indication (RSSI) level greater than a switch originating link setup (SOLS) threshold level, broadcasting a radio signal indicative of the channel and the RSSI level of the radio link with the called portable set to a first cell manager associated with said first radio base station; and f) establishing a radio link between the first base station and the called portable set on said indicated channel.

11. A method for providing wireless telephone service for portable telephone sets including portable telephone sets of itinerant users who from time to time may enter, linger, traverse, and depart an area of operation of the wireless telephone system, the method comprising the steps of:

providing a plurality of radio base stations organized into first and second groups of cells separated by a buffer group of cells, said first, second and buffer groups each having at least one radio base station, each radio base station being capable of supporting a radio link for communications with a portable telephone set;

at the first and second groups, from time to time soliciting a recordation response via at least one of the radio base stations in each of said first and second groups, recording a presence of a responding portable set of an itinerant user within a service area of one of the first and second groups, and responsive to a call request to the itinerant user, paging the responding portable telephone set via at least an idle one of the radio base stations of the buffer group and the group within which the portable telephone set is present, whereby the portable set of the itinerant user may be called via the telephone system even though the itinerant user may be unaware of and have taken no action in relation to the wireless telephone service.

12. A digital telephone system which includes portable telephone sets whose presence are of record and an itinerant portable telephone set whose presence may not normally be of record, comprising:

a plurality of radio base stations which provide the portable telephone sets communication paths with the digital telephone system; and a service controller managing a plurality of zone lists and a plurality of paging lists, each zone list defining a beacon zone and having stored therein an identity of at least one radio base station having been selected from the plurality of radio base stations, the beacon zones defined by the zone lists being separated by a buffer zone having at least one radio base station, each paging list having stored therein a corresponding one of the zone lists, and in addition thereto an identity of the at least one radio base station from the buffer zone.

13. A digital telephone system as defined in claim 12 wherein the service controller includes a plurality of cell managers each being responsive to message signals received from any of the radio base stations for causing one of the radio base stations to maintain a radio link with a portable telephone set of record.

* * * * *